United States Patent
Magagna et al.

(10) Patent No.: US 11,487,806 B2
(45) Date of Patent: Nov. 1, 2022

(54) MEDIA ITEM MATCHING USING SEARCH QUERY ANALYSIS

(71) Applicant: GOOGLE LLC, Mountain View, CA (US)

(72) Inventors: Fabio Magagna, Zürich (CH); Luca Chiarandini, Zürich (CH); Jakub Imriska, Zürich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/627,960

(22) PCT Filed: Dec. 12, 2017

(86) PCT No.: PCT/US2017/065922
§ 371 (c)(1),
(2) Date: Dec. 31, 2019

(87) PCT Pub. No.: WO2019/117879
PCT Pub. Date: Jun. 20, 2019

(65) Prior Publication Data
US 2020/0301957 A1 Sep. 24, 2020

(51) Int. Cl.
*G06F 16/435* (2019.01)
*G06F 16/738* (2019.01)
(52) U.S. Cl.
CPC .......... *G06F 16/435* (2019.01); *G06F 16/738* (2019.01)
(58) Field of Classification Search
None
See application file for complete search history.

(56) References Cited

U.S. PATENT DOCUMENTS

| | | | |
|---|---|---|---|
| 7,213,256 B1 * | 5/2007 | Kikinis | H04N 21/4756 725/39 |
| 7,519,529 B1 | 4/2009 | Horvitz | |
| 7,991,957 B2 | 8/2011 | Mercer | |
| 8,447,747 B1 * | 5/2013 | Yi | G06F 16/24578 707/705 |
| 8,788,514 B1 * | 7/2014 | Ramanarayanan | G06F 16/68 707/758 |

(Continued)

OTHER PUBLICATIONS

International Search Report and Written Opinion for Application No. PCT/US2017/065922, dated Jul. 13, 2018, 14 pages.

(Continued)

*Primary Examiner* — Richard L Bowen
(74) *Attorney, Agent, or Firm* — Lowenstein Sandler LLP

(57) ABSTRACT

A system and method are disclosed for media item matching using search query analysis. In an implementation, the method includes identifying, by a processing device, a first media item that has been removed from a media hosting platform due to a removal request associated with a reference media item of a first media owner; identifying, by the processing device, a search query corresponding to the first media item based on a history of search queries, wherein a search result of the search query included the first media item; obtaining, by the processing device, one or more additional media items included in the search result of the search query; and providing the one or more additional media items to the first media owner to determine whether to initiate one or more actions regarding the one or more additional media items.

17 Claims, 6 Drawing Sheets

(56) References Cited

U.S. PATENT DOCUMENTS

| | | |
|---|---|---|
| 9,129,029 B1 | 9/2015 | Seth et al. |
| 2008/0126303 A1 | 5/2008 | Park |
| 2009/0328237 A1* | 12/2009 | Rodriguez ......... H04N 21/8358 726/32 |
| 2011/0219013 A1* | 9/2011 | Maxwell, III .......... G06F 16/00 707/750 |
| 2014/0215349 A1* | 7/2014 | Kosslyn ............. G06Q 30/0631 715/745 |
| 2014/0215350 A1* | 7/2014 | Kosslyn ............... H04N 21/472 715/745 |
| 2015/0039620 A1* | 2/2015 | Ning ................... G06F 16/4387 707/740 |
| 2015/0154316 A1* | 6/2015 | Lightner ............. G06F 16/2468 707/723 |
| 2015/0310105 A1* | 10/2015 | Brew ................... G06F 16/2423 707/706 |
| 2016/0044054 A1 | 2/2016 | Stiansen et al. |
| 2016/0070748 A1* | 3/2016 | Firat ................... G06F 16/2425 707/730 |
| 2017/0091229 A1* | 3/2017 | Jagota ..................... G06F 16/23 |
| 2017/0270204 A1* | 9/2017 | Reagle ................. G06F 16/738 |
| 2017/0372142 A1* | 12/2017 | Bilobrov ............. H04N 21/233 |

OTHER PUBLICATIONS

Muller, Henning et al., "Learning from User Behavior in Image Retrieval: Application of Market Basket Analysis", International Journal of Computer Vision, Kluwer Academic Publishers, vol. 56, No. 1-2, Jan. 1, 2004 pp. 65-77, 10 pages.

* cited by examiner

FIG. 2

Search History 200

| Query ID | Result ID | Media Item ID | Viewcount |
|---|---|---|---|
| Query 1 | Result 1_1 | Media Item A | 96 |
| Query 1 | Result 1_1 | Media Item B | 5 |
| Query 1 | Result 1_1 | Media Item C | 51 |
| Query 1 | Result 1_1 | Media Item D | 80 |
| Query 1 | Result 1_2 | Media Item B | 78 |
| Query 1 | Result 1_2 | Media Item E | 99 |
| Query 1 | Result 1_2 | Media Item F | 41 |
| Query 2 | Result 2_1 | Media Item A | 67 |
| Query 2 | Result 2_1 | Media Item D | 88 |
| Query 2 | Result 2_1 | Media Item E | 99 |
| Query 3 | Result 3_1 | Media Item M | 2 |
| . | . | . | . |

| Candidate Video | Views | Channel | Reference | Thumbnails | Actions | |
|---|---|---|---|---|---|---|
| Tiger Queen (1/10) | 7,462 | Moovies R Us | Tiger Queen | | > | > |
| Tiger Queen Full Movie | 4,433 | Discover 200 | Tiger Queen | | > | > |
| Full Tiger Movie | 2,345 | Movie Depot | Tiger Queen | | > | > |
| Tiger Queen Part 4 | 5,878 | Gem Findings | Tiger Queen | | > | > |
| Tiger Woods Move | 589 | Golf Fan | Tiger Queen | | > | > |
| Tiger Queen Peliculas Completas | 9,010 | Peliculas Favorita | Tiger Queen | | > | > |
| Betty and The Feast Classic | 6,049 | Movie Depot | Betty and The Feast | | > | > |
| Betty's Thanksgiving Feast | 52 | Cooking by Betty | Betty and The Feast | | > | > |
| Betty Feast Musical | 2,783 | 300 And More | Betty and The Feast | | > | > |

FIG. 3

User Interface 300

MEDIA ITEM MATCHING USING SEARCH QUERY ANALYSIS

TECHNICAL FIELD

Aspects and implementations of the disclosure relate to content sharing platforms, and more specifically, to detecting media items matching a reference media item using search query analysis.

BACKGROUND

Content delivery platforms allow users to connect to and share information with each other. Many content delivery platforms include a content sharing aspect that allows users to upload, view, and share content, such as video items, image items, audio items, and so on. Other users of the content delivery platform may comment on the shared content, discover new content, locate updates, share content, and otherwise interact with the provided content. The shared content may include content from professional content creators, e.g., movie clips, TV clips, and music video items, as well as content from amateur content creators, e.g., video blogging and short original video items.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for media item matching using search query analysis is disclosed. The method may include identifying, by a processing device, a first media item that has been removed from a media hosting platform due to a removal request associated with a reference media item of a first media owner; identifying, by the processing device, a search query corresponding to the first media item based on a history of search queries, wherein a search result of the search query included the first media item; obtaining, by the processing device, one or more additional media items included in the search result of the search query; and providing the one or more additional media items to the first media owner to determine whether to initiate one or more actions regarding the one or more additional media items.

In some implementations, the history of search queries may specify search results of respective search queries and views of the search results by users and the first media item included in the search result of the search query may have been viewed by at least one user from the search query. In addition, the one or more additional media items included in the search result of the search query may have been viewed by at least one user from the search query.

In some implementations, identifying the first media item includes identifying the first media item that has been removed from the media hosting platform within a specified range of time period.

In some implementations, identifying the search query includes determining a number of media items corresponding to the search query that have been removed from the media hosting platform due to removal requests; and selecting the search query as the identified search query in view of determining that the number of media items is greater than a first threshold.

In some implementations, identifying the search query includes determining a first number of users of the media hosting platform that accessed or viewed the first media item from the search result of the search query; and selecting the search query as the identified search query in view of determining that the first number of users is greater than a second threshold.

In some implementations, obtaining the one or more additional media items include selecting a subset of additional media items included in the search result of the search query as the one or more additional media items. In some implementations, the subset is selected in view of a second number of users of the media hosting platform that accessed or viewed the one or more additional media items from the search result of the search query. In some implementations, the subset is selected in view of one or more factors associated with the one or more additional media items, wherein the one or more factors are used to determine likelihood of the one or more additional media items to match the reference media item. In some implementations, the one or more factors include at least one of a channel age, channel owner, number of related channels of the channel owner, channel traffic, number of channel subscribers, channel activity, size of media item, spam indicator, media item removal history, or audio to video ratio.

In some implementations, selecting the subset includes determining that the one or more additional media items include a second media item of a second media owner identified in an excluded media owner list; and excluding from the subset the second media item. In some implementations, selecting the subset includes comparing each of the additional media items to the reference media item; and for each one of the additional media items, determining that content of the one additional media item matches content of the reference media item by more than a specified match threshold; and adding the one additional media item to the subset of additional media items.

In some implementations, the method further includes obtaining one or more media items included in an additional search result of the search query; and providing the one or more media items to the first media owner to determine whether to initiate one or more additional actions regarding the one or more media items included in the additional search result.

In one implementation, a system for media item for media item matching using search query analysis is disclosed. The system may include a memory; and a processing device communicatively coupled to the memory, wherein the processing device is to: identify a first media item that has been removed from a media hosting platform due to a removal request associated with a reference media item of a first media owner; identify a search query corresponding to the first media item based on a history of search queries, wherein a search result of the search query included the first media item; obtain one or more additional media items included in the search result of the search query; and perform an action with regards to the one or more additional media items according to one or more rules specified by the first media owner.

In one or more of the disclosed implementations, computing devices for performing the operations of the above described implementations are also disclosed. Additionally, in implementations of the disclosure, a non-transitory machine-readable storage medium stores instructions for performing the operations of the above disclosed implementations.

BRIEF DESCRIPTION OF THE DRAWINGS

Aspects and implementations of the disclosure will be understood more fully from the detailed description given below and from the accompanying drawings of various aspects and implementations of the disclosure, which, however, should not be taken to limit the disclosure to the specific aspects or implementations, but are for explanation and understanding.

FIG. 2 is an example of search history information, in accordance with implementations of the disclosure.

FIG. 3 illustrates an example user interface for providing matching media items to media owners, in accordance with implementations of the disclosure.

DETAILED DESCRIPTION

Figure 1:
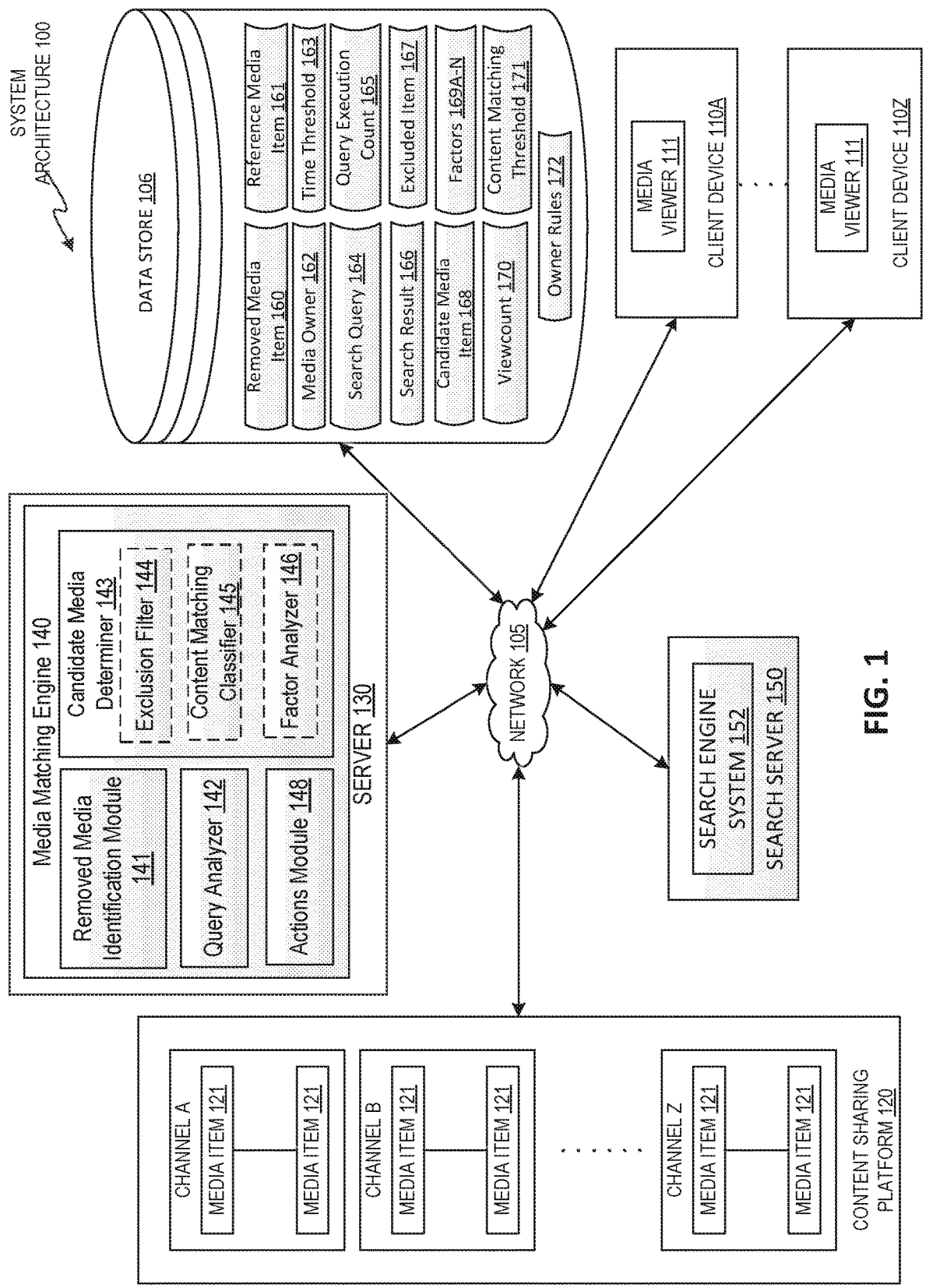
FIG. 1 illustrates an example system architecture, in accordance with one implementation of the disclosure.

A media item, such as a video item, may be uploaded to a media hosting platform (e.g., content sharing platform) by a media owner (e.g., a video creator or a video publisher uploading the video on behalf of the video creator with permission) for consumption by users of the media hosting platform via their user devices. In addition or alternatively, a media owner may designate the media item on the media hosting platform as a reference media item of the media owner. The media owner (who may be a user of the media hosting platform) may desire to prevent other users from uploading media items matching the content of the media owner's media items or impose other limitations on use of the matching media items on the media hosting platform.

Another user, other than the media owner and someone who does not have permission to upload the media item of the media owner, may upload another media item to the media hosting platform. The user uploaded media item (referred herein as a user media item) may be analyzed against a database of various media items, including the media owner's media item (referred to herein as a reference media item), to determine if the user media item matches the content of any media items in the database. Based on the content analysis, if it is determined that the user media item matches content of the media owner's reference media item, the media owner may decide to initiate an action (e.g., remove, mute, block, track, send electronic notification, etc.) on the media hosting platform with regard to the user media item. In some systems, the content analysis may be performed using comparison of video frames (e.g., electronically coded still images in the video). In some systems, the comparison may involve using a match threshold such that a user media is identified as a matching media if a quantity of matching video frames exceeds the match threshold, in order to prevent false positive match indications and/or to scale the system appropriately. However, in some instances, the outcome of the content analysis process may still omit additional matching user media items.

For example, a user may transform portions of a media item (e.g., the reference media item) and upload the transformed media item in order to circumvent the content analysis process. A user may transform the media item to ensure that the match threshold, as defined by the content analysis process, is not exceeded. For example, a user may remove a portion of the content of each image of the reference media item, and upload the transformed media item as his or her user media item. The user may perform various other actions on the media item to circumvent content matching, such as, append other content to the media item, append borders to the media item, add or remove audio, change spatial positioning of portions of the still images within the video, combine content from several videos in one video, etc. As a result, the user media item may not be included in the matching media item results of the content analysis process, as the threshold of match may not be exceeded.

Aspects of the present disclosure address the above-mentioned and other challenges by detecting matching media item based on analysis of non-content media signals (e.g., signals that are not based on media content), so that effect of content transformation and other content match circumventing actions are minimized or eliminated. For example, a user who takes a circumventing measure relevant to a reference media item may optimize the user media item to increase likelihood of the user media item to be included in various search results. The user may know or predict the terms that are relevant to the reference media item that viewers (e.g., users of the media hosting platform who consume media items) may search for. As such, the user may optimize the user media item title, description, etc. for a potential search query (e.g., a string of text) that viewers may search for.

An effort to track the media items may be made using particular search strings. For example, search results for a particular search string relevant to a reference item may be monitored by human beings to determine matches. However, manual tracking is inaccurate and inefficient. Additionally, search terms and queries may vary over time and based on various criteria, such as, viewer setting, language, cultural trend, slang usage, etc. These aspects may change frequently and change faster than the time it takes to detect the change in these aspects, which may not allow timely action on the matching media item. Thus, manual tracking and/or particular search term tracking cannot produce accurate identification of matching media items and cannot provide necessary efficiency in detecting the matching media items.

Aspect of the present disclosure address the above-mentioned and other challenges by taking advantage of non-content signals, such as, search queries, to detect matching media items. For example, aspects of the present disclosure provide for identifying a user media item that has been removed due to a removal request associated with the reference media item of the media owner and analyzing search result history to identify a search query that has been used to access the removed media item. Once the search query is identified, additional user media items that were included in the search result of the search query are obtained and the obtained additional user media items are provided to the media owner to initiate an action with regards to the additional user media items, and/or an action is performed following rules that the media owner identified in the system. As such, additional matching user media items which may have been circumvented during the content analysis process may still be identified because aspects of the present disclosure use additional, non-content based media signals to detect the additional matching media items.

In implementations, the term "matching media items" may refer to an agreement or correspondence in the details, portions, or features between two media items. "Media item matching" may refer to performing a comparison between two media items, or portions of two media items, to determine a similarity between the two media items. The likelihood of match may be a measure of the likelihood that two media items are similar, where 100% likelihood of match may indicate that two media items are likely to be exact match, and 0% likelihood of match may indicate that two media items are likely to be completely different.

In place of content comparison (e.g., video frames content comparison) and using match threshold to identify matching media items, aspects of the present disclosure may provide for a media matching engine that analyzes non-content based signals to narrow down additional matching media items. For example, a media owner (e.g., "EFG Studios") may specify a media item (e.g., "Tiger Queen") as a reference media item in a media hosting platform. A media matching engine may track a plurality of media items that have been removed from a media hosting platform due to removal requests over a period of time (e.g., last 10 years). Optionally, the removal requests for the plurality of media items may be associated with media owners and/or with reference media items. From the plurality of media items, the media matching engine may identify a removed media item (e.g., "The Movie Tiger Queen") that was uploaded by a user on a channel (e.g., "Movie Depot"). The media matching engine may consider media items removed within a specified time period (e.g., last 3 months). The media matching engine may analyze a history of search queries to identify a search query (e.g., "Tiger Queen Full Movie All Parts") corresponding to the removed media item, where the removed media item was included in a search result of the search query. The media matching engine may obtain additional media items (e.g., "Tiger Queen Full," "Tiger Queen Part 1 of 10," "Tiger Queen All Parts," "Tiger Woods Move," etc.) that were also included in the search result for the identified search query. One or more of the additional media items may be provided to the media owner to determine when to initiate an action (e.g., allow upload, send electronic notification, request removal, etc.). Alternatively, one or more actions may be performed according to some rules (e.g., request removal if uploaded by user "Movie Depot," etc.) specified by the media owner. In some implementations, the media matching engine may select a subset (e.g., "Tiger Queen Full," "Tiger Queen Part 1 of 10," "Tiger Queen All Parts,") of additional media items as the one or more of the additional media items to provide to the media owner or to perform an action.

Accordingly, aspects of the present disclosure provide for technical solutions to detect matching media items in an accurate and efficient manner. In particular, the technology disclosed herein may accurately identify matching user media items regardless of transformative actions performed on a reference media item by the uploading user or changes in search query terms associated with user media items. This increases reliability of the media hosting platform and reduces or eliminates the need for additional operations to perform corrective actions when an additional matching media item is missed using content analysis. As such, technology disclosed herein results in more efficient use of computing and processing resources and in reduced user input to identify matching media items from a, typically very large, set of media items. Aspects may address problems associated with processing of large sets of media items to identify particular media items and providing output to a user indicating a state of the set of media items that may prompt the user to interact with the technology or may be used by the user for further interaction with the technology.

FIG. 1 illustrates an example system architecture 100, in accordance with one implementation of the disclosure. The system architecture 100 includes client devices 110A through 110Z, a network 105, a data store 106, a content sharing platform 120, a server 130, and a search server 150.

In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). In one implementation, data store 106 stores media items, such as video items, or content of segments of the media items. Data store 106 may store one or more data elements, such as, one or more removed media item 160, reference media item 161, media owner 162, time threshold 163, search query 164, query execution count 165, search result 166, excluded item 167, candidate media items 168, factors 169A-N, viewcount 170, content matching threshold 171, owner rules 172, etc.

The client devices 110A through 110Z may each include computing devices such as personal computers (PCs), laptops, mobile phones, smart phones, tablet computers, netbook computers, network-connected televisions, etc. In some implementations, client devices 110A through 110Z may also be referred to as "user devices." Each client device includes a media viewer 111. In one implementation, the media viewers 111 may be applications that allow users to view or upload content, such as images, video items, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also include an embedded media player (e.g., a Flash® player or an HTML5 player) that is embedded in a web page (e.g., a web page that may provide information about a product sold by an online merchant). In another example, the media viewer 111 may be a standalone application (e.g., a mobile application or app) that allows users to view digital media items (e.g., digital video items, digital images, electronic books, etc.). According to aspects of the disclosure, the media viewer 111 may be a content sharing platform application for users to record, edit, and/or upload content for sharing on the content sharing platform. As such, the media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

The media viewer 111 may also provide a user interface (e.g., a web browser user interface or a mobile application user interface) to allow a user of a respective client device 110A-110Z to submit a search query (e.g., a string of text) to the search server 150, which may in turn provide a plurality of search results to the respective client device 110A-110Z. For example, if a user of the client device 110A submits a search query to the search server 150, the search server 130 may return a set of scored search results, which may be presented for display in the user interface as a ranked list. The user may select one of the search results in order to retrieve associated content (e.g., a document, a website, video content, an image, music, etc.) from the content sharing platform 120 (or the search server 150 may facilitate the retrieval of the content from the content sharing platform 120 on behalf of the client device 110A). Additionally, the media viewer 111 may also provide a user interface to allow a user to view and manage reference media items and matching media items, such as the interface described in FIG. 3.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), disapprove of ("dislike"), and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed including at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as content or a content item.

A media item 121 may be consumed via the Internet and/or via a mobile device application. For brevity and simplicity, a video item is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106. In another implementation, the content sharing platform 120 may store video items as electronic files in one or more formats using data store 106.

In one implementation, the search server 150 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to process search queries received from the client devices 110A-110Z, generate lists of search results based on the search queries, and provide the search results to the requesting client devices 110A-110Z. The search server 150 includes a search engine system 152.

In one implementation, the search engine system 152 may receive a search query (e.g., from one of the client devices 110A-110Z) and generate a set of search results of media items relevant to the search query, which may be subsequently transmitted back to the client device from which the query originated. The search engine system 152 may search for media items related to the search query (e.g., by searching descriptions of content from the content sharing platform 120, searching the body of web documents on the content sharing platform 120 or data store 106, etc.), for example, using any suitable search algorithm. The search engine system 152 may generate a set of search results (e.g., search results 166) by identifying media items relevant to the search query and ranking the media items. A history of search results, including executed search queries, search result sets, media items, view counts, etc. may be stored in a relational data table as depicted in FIG. 2.

In one implementation, the server 130 may be one or more computing devices (e.g., a rackmount server, a server computer, etc.). The server 130 may be included in the content sharing platform 120, be an independent system or be part of another system/platform. The server 130 may include a media matching engine 140.

In one implementation, a user media item and a reference media item which are matched by the media matching engine 140 are video items. A video item is a set of sequential video frames (e.g., image frames) representing a scene in motion. For example, a series of sequential video frames may be captured continuously or later reconstructed to produce animation. Video items may be presented in various formats including, but not limited to, analog, digital, two-dimensional and three-dimensional video. Further, video items may include movies, video clips or any set of animated images to be displayed in sequence. In addition, a video item may be stored as a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example. In one implementation, fingerprints of a video item may be fingerprints of the video component of the video item. In other implementations, fingerprints of a video item may be fingerprints of the audio component of the video item. In yet other implementations, fingerprints of a video item may be fingerprints of both the video component and audio component of the video item.

The media matching engine 140 enables the detection of a matching between a user media item that is uploaded to the content sharing platform 120 (e.g., as part of a channel or an independent media item), and a reference media item that is uploaded to the content sharing platform 120 (e.g., as part of a channel or an independent media item) or has been identified as a reference item for media item matching. The media matching engine 140 may be executed as a result of an ad hoc initiation, as a result of a scheduled initiation, and/or a as a result of a continuous execution at specified frequency. The media matching engine 140 may include a removed media identification module 141, a query analyzer 142, a candidate media determiner 143, and an actions module 148. The candidate media determiner 143 may further include various further modules, such as, an exclusion filter 144, a content matching classifier 145, a factor analyzer 146, etc. Alternatively, the module 144-146 may be external to the candidate media determiner 143, such that there is communication between the modules 144-146 and candidate media determiner 143. For example, outputs from candidate media determiner 143 may be fed into one or more of the modules 144-146 as inputs, or vice versa.

In one implementation, the media matching engine 140 enables the detection of a matching between the user media item and the reference media item using search query analysis. The media matching engine 140 may identify a media item (e.g., a user media item) that has been removed from a media hosting platform due to a removal request associated with a reference media item of a media owner. The media matching engine 140 may identify a search query corresponding to the removed media item based on a history of search queries (such as, using a search history as depicted in FIG. 2). The removed media item may be included in a search result of the search query. The media matching engine 140 may obtain one or more additional media items included in the search result of the search query. In one implementation, the media matching engine 140 may provide the additional media items to the media owner to determine whether to initiate one or more actions regarding the additional media items. In addition or alternatively, the media matching engine 140 may perform one or more actions regarding the additional media items according to one or more rules specified by the first media owner.

The media matching engine 140 and its modules and sub-modules may use various data elements (e.g., data elements 160-172) stored in data store 106 in performing the operations as described in the present disclosure. Each of the data elements 160 through 172 may represent one or more of the data elements (e.g., one or more removed media items 160, one or more reference media items 161, and so on).

In some implementations, the media matching engine 140 may track a plurality of removed media items that have been removed from the media hosting platform (e.g., content sharing platform 120) due to removal requests from media owners over a period of time (e.g., last 10 years). The removed media identification module 141 of the media matching engine 140 may identify a media item (e.g., removed media item 160) from the plurality of removed media items that has been removed due to a removal request associated with a reference media item (e.g., reference media item 161) of a first media owner (e.g., media owner 162).

For example, media owner 162 may identify "Media Item XYZ" as reference media item 161. "Media Item A" may have been removed from content sharing platform 120 due to a removal request associated with the reference media "Media Item XYZ." The removed media identification module 141 may identify "Media Item A" from a plurality of removed media items stored in data store 106.

In some implementations, identifying the removed media item includes identifying a media item that has been removed from the media hosting platform within a specified time period. For example, the media matching engine may track the plurality of media items that have been removed over a period of time, such as, last 10 years. However, removed media identification module 141 may limit the selection from within a specified time period (e.g., last 3 months, a 3 month window starting on a first Date/Time to a second Date/Time, etc.) defined as time threshold 163 in data store 106 to identify the removed media item. This may enable scaling the matching engine's performance. Additionally, this may also limit the removed media items to media items and search queries that are relevant to current trend. Additionally, identification of the removed media item may be based on attributes, such as, a total number of views of the removed media item (e.g., indicating level of popularity), number of days the removed media remained on the platform before removal (e.g., indicating ease of finding the media item), number of views per day (e.g., another means of assessing level of popularity considering media may not accumulate views once media is removed), etc.

In some implementations, query analyzer 142 of the media matching engine 140 may identify a search query 164 corresponding to the removed media item 160 based on a history of search queries. For example, FIG. 2 depicts an example search history 200. Search history 200 may depict history of search results, including executed search queries 220, search result sets 230, media items 240, view counts 250, etc. In an example, search history 200 may be stored in a relational data table 210 stored in data store 106. In one example of such a data table, executed search queries 220 may be stored using column "Query ID," search result sets 230 may be stored using column "Result ID," media items 240 may be stored using column "Media Item ID," view counts 250 may be stored using column "Viewcount," etc. FIG. 2 identifies example of two unique queries, a "Query 1" in the set of table entries 260 and a "Query 2" in the set of table entries 270 and corresponding search results. "Query 1" shows two result sets, a first result set "Result 1_1" in the set of table entries 280 and a second result set "Result 1_2" in the set of table entries 290, and "Query 2" shows one result set, a third result set "Result 2_1" in the set of table entries 295. Each result set shows a corresponding set of media items within column 240 and a corresponding view count within column 250.

In an example, the removed media item 161 identified by the removed media identification module 141 may be included in search result 166 of the search query 164 in search history 200. The query analyzer 142 may identify the search query 164 corresponding to the removed media item 161. For example, identified removed media item "Media Item A" is included in result set "Result 1_1" of "Query 1" and result set "Result 2_1" of "Query 2." Query analyzer 142 may identify one or more of the search queries "Query 1" corresponding to the removed media item "Media Item A" and "Query 2" corresponding to the removed media item "Media Item A" based on the history of search queries.

In some implementations, query analyzer 142 may identify one or more search queries based on a number of removed media items resulting from such search queries. For example, query analyzer 142 may identify one or more search queries 164 corresponding to a particular removed media item 160. Each of the one or more search queries 164 may correspond to one or more removed media items. Query analyzer 142 may determine the number of removed media items corresponding to the one or more search queries and compare the number to a threshold number of removed media items. If it is determined that for a query of the one or more queries, the number of media items corresponding to the query is more than the threshold number of removed media items, then the query may be selected as an identified query. In an example, a removed media item for a reference "Betty and The Feast" may correspond to a query "Thanksgiving Feast by Cooking by Betty." Query analyzer 142 may determine the total number of media items that have been removed corresponding to this query. The total number may be 3. The number is compared against a threshold number specified to be "5." Since the total number does not exceed the threshold number, the query may not be selected. In another example, if the threshold number is 2, the query may be selected. The threshold may represent a number or percentage.

In some implementations, query analyzer 142 may identify one or more search queries based on a number of viewers that viewed the removed media item coming from the identified search query. For example, query analyzer 142 may determine that 96 viewers viewed removed media item "Media Item A" from Query 1, as represented in row 251 depicted in FIG. 2, and 67 viewers viewed removed media item "Media Item A" from Query 2, as represented in row 252 of FIG. 2. If the query analyzer determines that the number of users (e.g., viewers) "96" is greater than a threshold number of users, for example 70, the query "Query 1" is selected. If it is less than the threshold (e.g., 70), then the query analyzer 142 does not select the search query as the identified search query. In some implementations, an overall importance of the query to the media hosting platform may be determined by using the query execution count 165, using an analytical dashboard, etc.

In some implementations, candidate media determiner 143 of the media matching engine 140 may obtain one or more additional media items as candidate media items 168 included in the search result 166 of the search query 164. For example, candidate media determiner 143 may obtain additional media items "Media Item B," "Media Item C," and "Media Item D" included in search result "Result 1_1" of query "Query 1" in addition to the "Media Item A" included in the search result, as depicted in FIG. 2. In one example, one or more additional media items may be media items that have not been removed from the media hosting platform.

In some implementations, candidate media determiner 143 may obtain one or more media items included in an additional search result of the search query 164 as candidate media items 168. For example, candidate media determiner 143 may obtain media items "Media Item B," "Media Item E," and "Media Item F" included in an additional search result "Result 1_2" of query "Query 1" as candidate media items 168, as depicted in FIG. 2.

In some implementations, candidate media determiner 143 may obtain the one or more additional media items by selecting a subset of additional media items included in the search result 166 of the search query 164 as candidate media item 168. For example, "Media Item C," and "Media Item D" are one subset of all additional media items included in search result "Result 1_1" of query "Query 1," which may be selected by the candidate media determiner 143 as the one or more additional media items.

In some implementations, candidate media determiner 143 may select the subset based on a number of users that viewed the one or more additional media items from the search result of the search query. For example, "Media Item C," and "Media Item D" of search result "Result 1_1" may be selected as the subset based on each of the media items receiving over a threshold number of views, such as, over 50 views, as depicted in FIG. 2. In another example, the subset may be selected based on a top N of the views of the additional media items, where N is a number or percentage defined in the media matching engine 140.

In some implementations, candidate media determiner 143 may select the subset using exclusion filter 144. In one example, exclusion filter 144 may determine that the one or more additional media items include a second media item identified as an excluded item 167. For example, the excluded item 167 may be a particular media item identified and stored in data store 106, or the excluded item 167 may include a second media item from a second media owner as an excluded media owner. Exclusion filter 144 may exclude from the subset the second media item. In an example, a media owner "EFGH Studios" may be identified as an excluded media owner for a reference video "Tiger Queen." Exclusion filter 144 may determine that the obtained one or more additional media items include a media item "Tiger Queen Trailer" of excluded media owner "EFGH Studios" and exclude the media item from being included in the subset of the one or more additional videos.

In some implementations, candidate media determiner 143 may select the subset using content matching classifier 145. Content matching classifier 145 may perform content analysis and compare each of the additional media items to the reference media item 161. For each one of the additional media items, content matching classifier 145 may determine that content of the additional media item matches content of the reference media item by more than a specified content matching threshold 171. For example, the match threshold identified for the content matching classifier 145 used under or in conjunction with media matching engine 140 may be less than a match threshold that may be used to identify matching content using a standalone content matching classifier. For example, if for a standalone content matching classifier uses the match threshold to be 70% match with reference content to identify as a matching media, the match threshold may be identified as 30% match when used with media matching engine 140. This is because the media items on which the content analysis is applied to already have been analyzed with non-content signals (e.g., using search query analysis) and as such, may have less likelihood to result into false positive matches. Any media item for which the threshold is met, the media item may be added to the subset of additional media items.

In some implementations, the subset may be selected in view of one or more factors associated with the one or more additional media items. Factor analyzer 146 may be used to determine likelihood of the one or more additional media items to match the reference media item. Factor analyzer 146 may use one or more factors 169A-N to determine the likelihood of match. In some implementations, the one or more factors may include at least one of a channel age, channel owner, number of related channels of the channel owner, channel traffic, number of channel subscribers, channel activity, size of media item, spam indicator, media item removal history or audio to video ratio. For example, a very young channel may be more likely to produce a matching media item than an established channel that has not been taken action against. In another example, a channel owner having a high number of channels may indicate likelihood to produce media items matching a reference media item. For example, media item size being similar to reference media item may indicate higher likelihood of match. In some implementations, each of the factors may be assigned a particular weight. Some factors may carry more weight, while some may carry less weight assigned to them. An overall score may be calculated by multiplying the likelihood from each factor associated with a media item by the corresponding weight, and, optionally, diving by the total number of factors used. The overall score may be used when an aggregate of factors are desired to be applied to the additional media item.

In some implementation, the actions module 148 may be used to initiate an action with regards to the obtained candidate media items 168. In one implementation, the actions module 148 may provide the obtained one or more additional media items (e.g., candidate media item 168) to the media owner to determine whether to initiate one or more actions regarding the one or more additional media items. The actions module 148 may provide the obtained one or more additional media items to media owner 162 using an interface depicted in FIG. 3. The actions module 148 may receive one or more actions from media owner from the interface and perform the one or more actions with regards to the one or more additional media items. For example, media owner 162 may initiate an action to request removal of candidate media item 168. Actions module 148 may receive the request, and initiate subsequent operations necessary to remove the media item.

In addition or alternatively, the media matching engine 140 may perform one or more actions regarding the one or more additional media items according to one or more rules 172 specified by the media owner 162. An action may include to remove, mute, block, track, send electronic notification, etc. on the media hosting platform with regard to the user media item.

In general, functions described in one implementation as being performed by the content sharing platform 120, server 130, or search server 150, can also be performed on the client devices 110A through 110Z in other implementations, if appropriate. In addition, the functionality attributed to a particular component can be performed by different or multiple components operating together. The content sharing platform 120, server machine 130, or server machine 150 can also be accessed as a service provided to other systems or devices through appropriate application programming interfaces, and thus is not limited to use in websites.

Although implementations of the disclosure are discussed in terms of content sharing platforms, implementations may also be generally applied to any type of media hosting platform providing connections between users, or content delivery platform. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

FIG. 3 illustrates an example user interface 300 for providing matching media items to media owners and corresponding actions that the media owner can initiate. For example, the user interface 300 may correspond to a user interface presented by one of the respective media viewers 111 of the client device 110. The interface 300 may provide a list of media items for the media owner's review and to initiate one or more actions. For example, the user interface 300 may include a column 302 for candidate video, which may provide the obtained one or more additional media items (e.g., candidate media item 168) to the media owner.

For example, the user interface 300 may include column 303 for number of views, column 304 for a channel of the matching media item, column 305 for depicting the reference media item, column 306 for thumbnails related to the one or more additional media items, and a column 307 for a set of actions. In an example, available actions on the example interface 300 includes an allow button 310, an email button 312, and a request removal button 314. One or more additional media items are shown as candidate video items and a scrollbar 316 indicates availability of additional candidate videos.

As illustrated in FIG. 3, for example, videos matching reference media item "Tiger Queen" in column 305 are provided in candidate video column 302. Media owner can observe the view count in column 303, channel owner information in 304, and representative thumbnails of the candidate videos in column 306 to make a decision. For example, the media owner may review the provided media items and decide to email the owner of "Tiger Queen Pelicas Completas" to include credit to the reference video or credit to media owner. The media owner may click on email button 312 to initiate such electronic communication. The media owner may decide to allow usage of the candidate video "Tiger Woods Move" uploaded by user "Golf Fan" by clicking on the allow button 310. "Allowing" may indicate that the media item may continue to remain on the media hosting platform. In another example, the media owner may decide to request removal of "Tiger Queen (1/10)" by clicking the button 316 corresponding to the listing of the video. In some implementations, the interface may provide an option to remove a media item from the list of media items to review. The actions module 148 may receive one or more of these actions from media owner and perform the one or more actions with regards to the one or more additional media items.

Figure 4:
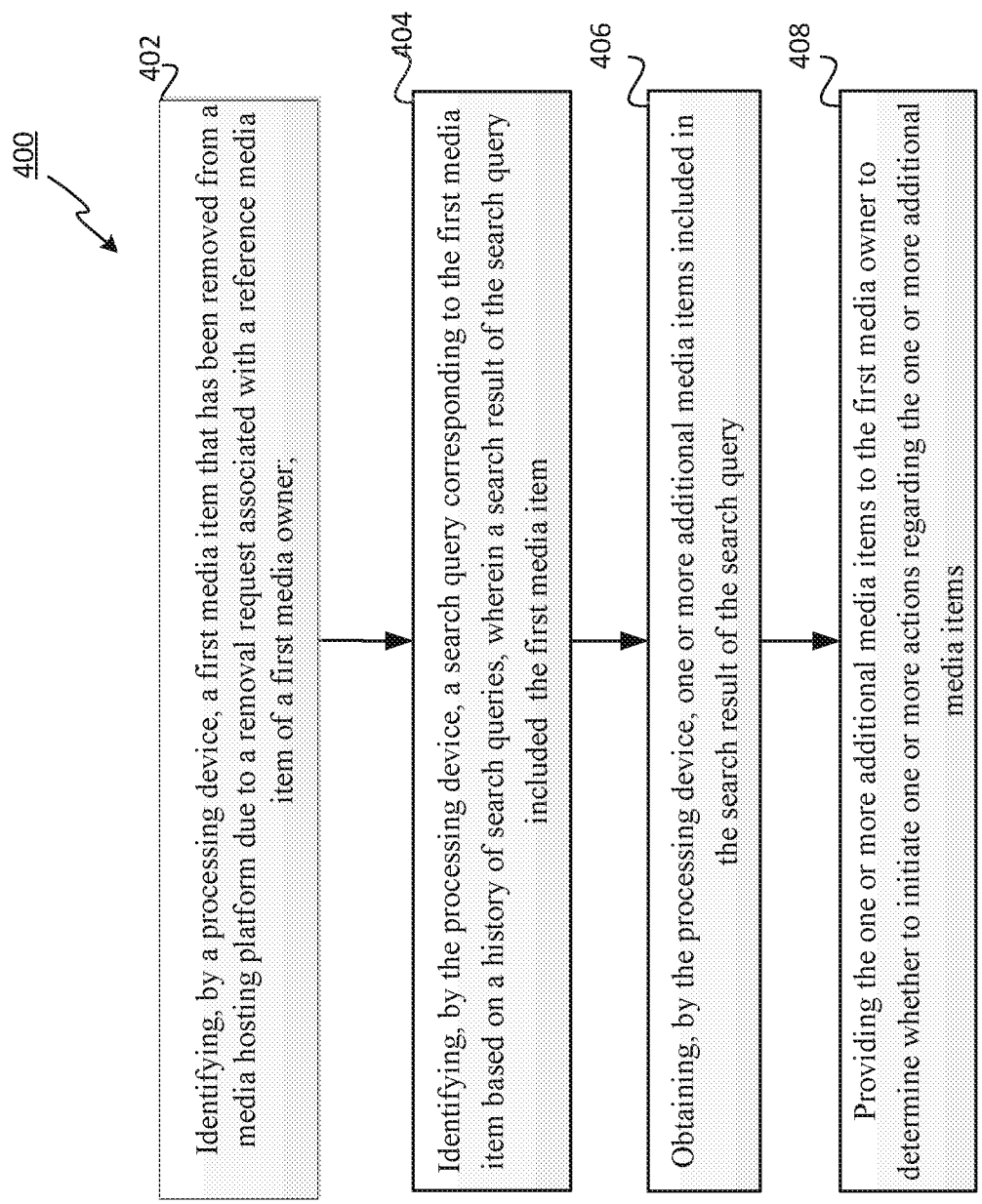
FIG. 4 depicts a flow diagram of one example of a method for media item matching using search query analysis, in accordance with implementations of the disclosure.
Figure 5:
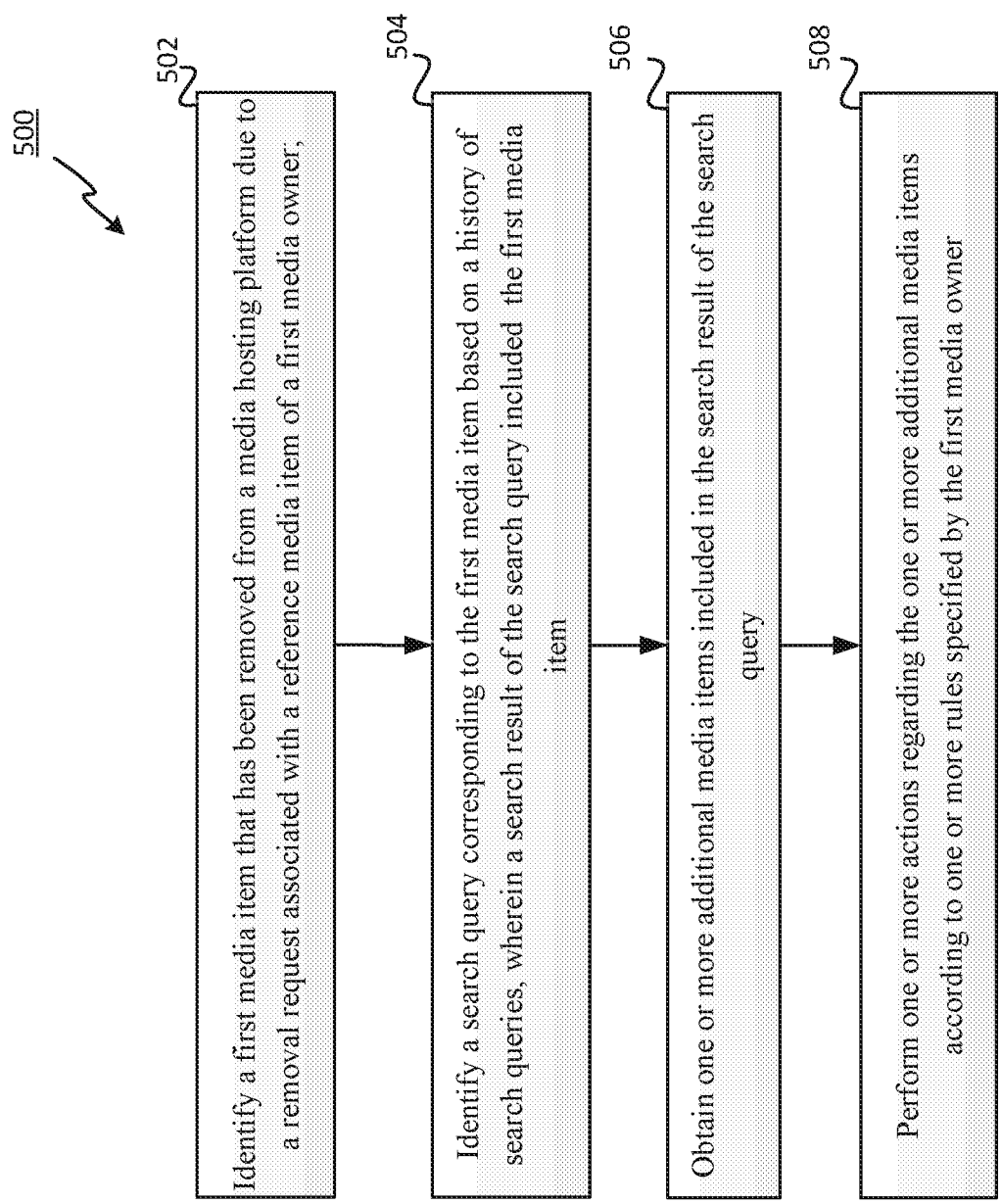
FIG. 5 is a flow diagram of one example of a method for performing an action responsive to media item matching using search query analysis in accordance with an implementation of the disclosure.

FIG. 4 is a flow diagram illustrating a method 400 for media item matching using search query analysis in accordance with an implementation of the disclosure. FIG. 5 is a flow diagram illustrating a method 500 for performing an action responsive to media item matching using search query analysis in accordance with an implementation of the disclosure. The methods 400 and 500 may be performed by processing logic that includes hardware (e.g., circuitry, dedicated logic, programmable logic, microcode, etc.), software (e.g., instructions run on a processing device to perform hardware simulation), or a combination thereof. In one implementation, the methods 400 and 500 may each be performed by a processing device executing the media matching engine 140 as described with respect to FIGS. 1-3.

Referring to FIG. 4, the method 400 begins at block 402 when a processing device may identify a first media item that has been removed from a media hosting platform due to a removal request associated with a reference media item of a first media owner. In some implementations, identifying the first media item includes identifying the first media item that has been removed from the media hosting platform within a specified time period. At block 404, the processing device may identify a search query (e.g., a search string) corresponding to the first media item based on a history of search queries. The search result of the search query may include the first media item. In some implementations, the history of search queries may specify search results of respective search queries and views of the search results by users and the first media item included in the search result of the search query may have been viewed by at least one user from the search query. In addition, the one or more additional media items included in the search result of the search query may have been viewed by at least one user from the search query. At block 406, the processing device may obtain one or more additional media items included in the search result of the search query. In some implementations, the processing device may obtain one or more media items included in an additional search result of the search query and provide the one or more media items to the first media owner to determine whether to initiate one or more additional actions regarding the one or more media items included in the additional search result.

In some implementations, obtaining the one or more additional media items include selecting a subset of additional media items included in the search result of the search query as the one or more additional media items. In some implementations, selecting the subset includes determining that the one or more additional media items include a second media item of a second media owner identified in an excluded media owner list, and excluding from the subset the second media item. In some implementations, selecting the subset includes comparing each of the additional media items to the reference media item and for each one of the additional media items, determining that content of the one additional media item matches content of the reference media item by more than a specified match threshold and adding the one additional media item to the subset of additional media items.

At block 408, the processing device may provide the one or more additional media items to the first media owner to determine whether to initiate one or more actions regarding the one or more additional media items. An action may include allowing, removing, muting, blocking, tracking, sending electronic notification, etc. on the media hosting platform with regard to the user media item. For example, a media owner may review the provided media items and may indicate to allow one media item (e.g., indicate that the media item may continue to remain in the platform), track additional media items from the same user or channel, send an electronic notification including a link to a media item of the media owner to include in the user media item, remove provided media item from the list of items to review, etc.

FIG. 5 depicts a flow diagram illustrating a method 500 for performing an action responsive to media item matching using search query analysis in accordance with an implementation of the disclosure. At block 502, a first media item that has been removed from a media hosting platform due to a removal request associated with a reference media item of a first media owner is identified. In some implementations, identifying the first media item includes identifying the first media item that has been removed from the media hosting platform within a specified range of time period.

At block 504, a search query corresponding to the first media item based on a history of search queries may be identified. The search result of the search query may include the first media item. Additionally, identifying the search query may include determining a number of media items corresponding to the search query that have been removed from the media hosting platform due to removal requests, and selecting the search query as the identified search query in view of determining that the number of media items is greater than a first threshold. In some implementations, identifying the search query may include determining a first number of users of the media hosting platform that viewed the first media item from the search result of the search query, and selecting the search query as the identified search query in view of determining that the first number of users is greater than a second threshold.

At block 506, one or more additional media items included in the search result of the search query may be obtained. In some implementations, obtaining the one or more additional media items include selecting a subset of additional media items included in the search result of the search query as the one or more additional media items. In some implementations, the subset is selected in view of a second number of users of the media hosting platform that viewed the one or more additional media items from the search result of the search query. In some implementations, the subset is selected in view of one or more factors associated with the one or more additional media items, wherein the one or more factors are used to determine likelihood of the one or more additional media items to match the reference media item. In some implementations, the one or more factors include at least one of a channel age, channel owner, number of related channels of the channel owner, channel traffic, number of channel subscribers, channel activity, size of media item, spam indicator, media item removal history, or audio to video ratio.

At block 508, an action may be performed, by the processing device executing the operations, with regards to the one or more additional media items according to one or more rules specified by the first media owner. An action may include removing, muting, blocking, and/or tracking the media item or sending electronic notification, etc., on the media hosting platform with regard to the user media item. For example, a rule may specify that a media item uploaded on a certain channel may be automatically requested to be removed from the media hosting platform. In another example, a rule may specify that a notification may be automatically sent to the owner of the user media item to provide notice of matching content detection.

Figure 6:
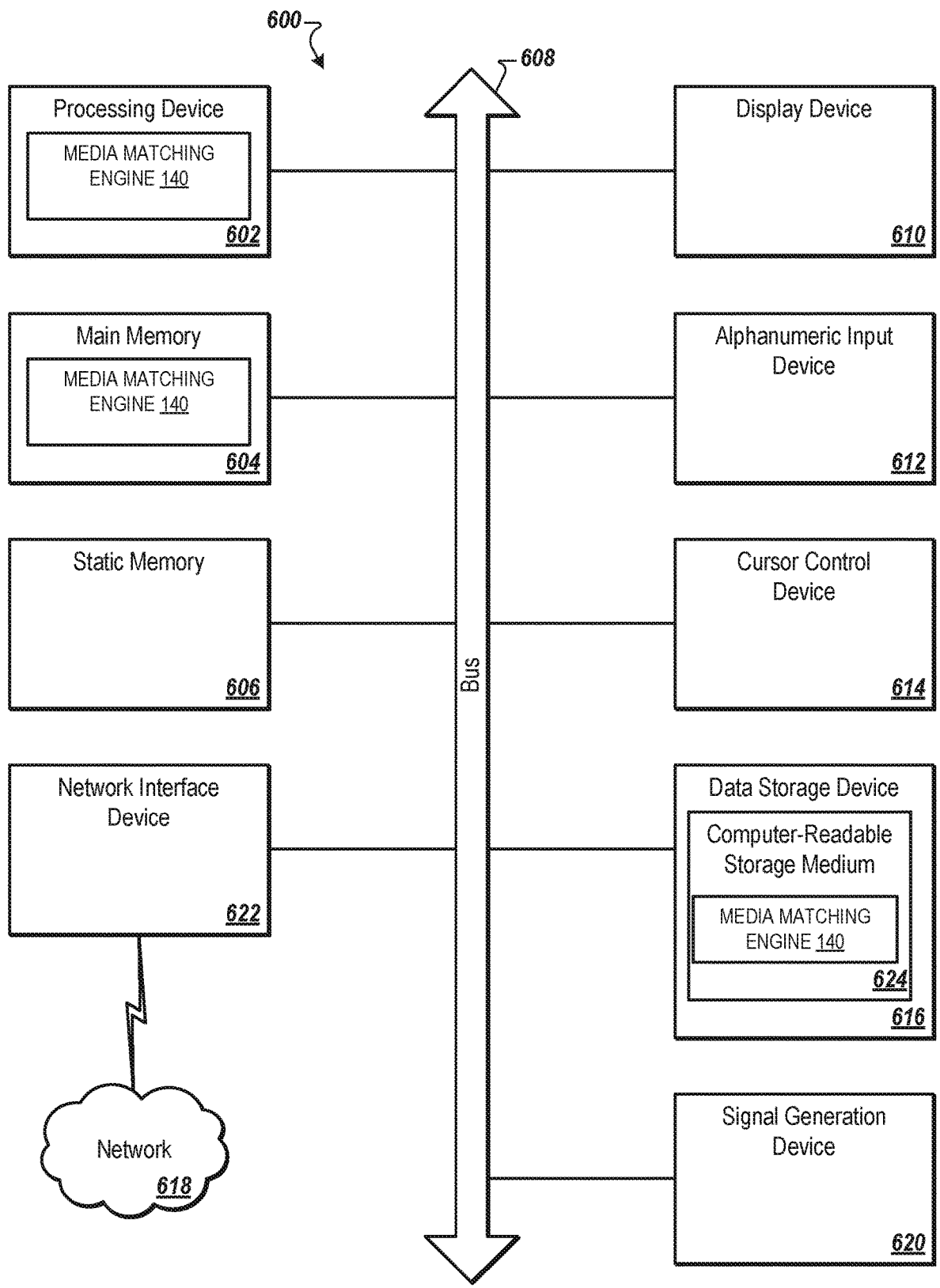
FIG. 6 is a block diagram illustrating an exemplary computer system, in accordance with an implementation of the disclosure.

FIG. 6 is a block diagram illustrating an exemplary computer system 600. The computer system 600 executes one or more sets of instructions that cause the machine to perform any one or more of the methodologies discussed herein. Set of instructions, instructions, and the like may refer to instructions that, when executed computer system 600, cause computer system 600 to perform one or more operations of media matching engine 140. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions of the system architecture 100 and the media matching engine 140 for performing the operations and steps discussed herein.

The computer system 600 may further include a network interface device 622 that provides communication with other machines over a network 618, such as a local area network (LAN), an intranet, an extranet, or the Internet. The computer system 600 also may include a display device 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a non-transitory computer-readable storage medium 624 on which is stored the sets of instructions of the system architecture 100 and media matching engine 140 embodying any one or more of the methodologies or functions described herein. The sets of instructions of the system architecture 100 and media matching engine 140 may also reside, completely or at least partially, within the main memory 604 and/or within the processing device 602 during execution thereof by the computer system 600, the main memory 604 and the processing device 602 also constituting computer-readable storage media. The sets of instructions may further be transmitted or received over the network 618 via the network interface device 622.

While the example of the computer-readable storage medium 624 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "comparing", "determining", "generating", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A method comprising:
   identifying, by a processing device, a first media item that has been removed from a media hosting platform due to a removal request caused by a determination during content analysis that the first media item matches a reference media item of a first media owner;
   identifying, by the processing device, an indication that one or more additional media items were not identified as matching the reference media item due to one or more circumventing actions intended to circumvent the content analysis, wherein identifying the indication comprises:
      identifying, by the processing device, a search query corresponding to the first media item based on a history of search queries, wherein a search result of the search query included the first media item;
      determining, by the processing device, that the one or more additional media items are included in the search result of the search query; and
      analyzing the one or more additional media items based on additional factors to identify a subset of the one or more additional media items that was likely subjected to the circumventing actions to circumvent the content analysis, wherein the additional factors comprise at least one of a channel age, a channel owner, a number of related channels of the channel owner, channel traffic, a number of channel subscribers, channel activity, a spam indicator, a media item removal history, or an audio to video ratio; and
   providing the subset of the one or more additional media items to the first media owner to determine whether to initiate one or more actions regarding the one or more additional media items.

2. The method of claim 1, wherein:
   the history of search queries specifies search results of respective search queries and views of the search results by users;
   the first media item included in the search result of the search query was viewed by at least one user that submitted the search query; and
   the one or more additional media items included in the search result of the search query were viewed by at least one user that submitted the search query.

3. The method of claim 1, wherein identifying the first media item comprises identifying the first media item that has been removed from the media hosting platform within a specified time period.

4. The method of claim 1, wherein identifying the search query comprises:
   determining a number of media items corresponding to the search query that have been removed from the media hosting platform due to removal requests; and
   selecting the search query as the identified search query in view of determining that the number of media items is greater than a first threshold.

5. The method of claim 1, wherein identifying the search query comprises:
   determining a first number of users of the media hosting platform that viewed the first media item from the search result of the search query; and
   selecting the search query as the identified search query in view of determining that the first number of users is greater than a second threshold.

6. The method of claim 1, further comprising:
   obtaining one or more media items included in an additional search result of the search query; and providing the one or more media items to the first media owner to determine whether to initiate one or more additional actions regarding the one or more media items included in the additional search result.

7. The method of claim 1, wherein identifying the subset comprises:
determining that the one or more additional media items include a second media item of a second media owner identified in an excluded media owner list; and
excluding the second media item from the subset.

8. The method of claim 1, wherein selecting identifying the subset comprises:
comparing each of the additional media items to the reference media item; and
for each one of the additional media items:
determining that content of the one additional media item matches content of the reference media item by more than a specified match threshold; and
adding the one additional media item to the subset of additional media items.

9. A system comprising:
a memory; and
a processing device communicatively coupled to the memory, wherein the processing device is to:
identify a first media item that has been removed from a media hosting platform due to a removal request caused by a determination during content analysis that the first media item matches a reference media item of a first media owner;
identify an indication that one or more additional media items were not identified as matching the reference media item due to one or more circumventing actions intended to circumvent the content analysis, wherein to identify the indication, the processing device is to:
identify a search query corresponding to the first media item based on a history of search queries, wherein a search result of the search query included the first media item;
determine that one or more additional media items are included in the search result of the search query; and
analyze the one or more additional media items based on additional factors to identify a subset of the one or more additional media items that was likely subjected to the circumventing actions to circumvent the content analysis, wherein the additional factors comprise at least one of a channel age, a channel owner, a number of related channels of the channel owner, channel traffic, a number of channel subscribers, channel activity, a spam indicator, a media item removal history, or an audio to video ratio; and
perform an action with regards to the subset of the one or more additional media items according to one or more rules specified by the first media owner.

10. The system of claim 9, wherein to identify the search query, the processing device is to:
determine a number of media items corresponding to the search query that have been removed from the media hosting platform due to removal requests; and
select the search query as the identified search query in view of determining that the number of media items is greater than a first threshold.

11. The system of claim 9, wherein to identify the search query, the processing device is to:
determine a first number of users of the media hosting platform that viewed the first media item from the search result of the search query; and
select the search query as the identified search query in view of determining that the first number of users is greater than a second threshold.

12. The system of claim 9, wherein:
the history of search queries specifies search results of respective search queries and views of the search results by users;
the first media item included in the search result of the search query was viewed by at least one user that submitted the search query; and
the one or more additional media items included in the search result of the search query were viewed by at least one user that submitted the search query.

13. The system of claim 9, wherein to identify the subset, the processing device is to:
determine that the one or more additional media items include a second media item of a second media owner identified in an excluded media owner list; and
exclude the second media item from the subset.

14. A non-transitory machine-readable medium having instructions encoded thereon that, when executed by a processing device, cause the processing device to:
identify a first media item that has been removed from a media hosting platform due to a removal request caused by a determination during content analysis that the first media item matches a reference media item of a first media owner;
identify an indication that one or more additional media items were not identified as matching the reference media item due to one or more circumventing actions intended to circumvent the content analysis, wherein to identify the indication, the processing device is to:
identify a search query corresponding to the first media item based on a history of search queries, wherein a search result of the search query included the first media item;
determine that the one or more additional media items are included in the search result of the search query; and
analyze the one or more additional media items based on additional factors to identify a subset of the one or more additional media items that was likely subjected to the circumventing actions to circumvent the content analysis, wherein the additional factors comprise at least one of a channel age, a channel owner, a number of related channels of the channel owner, channel traffic, a number of channel subscribers, channel activity, a spam indicator, a media item removal history, or an audio to video ratio; and
provide the subset of the one or more additional media items to the first media owner to determine whether to initiate one or more actions regarding the one or more additional media items.

15. The non-transitory machine-readable medium of claim 14, wherein to identify the search query, the processing device is to:
determine a first number of users of the media hosting platform that viewed the first media item from the search result of the search query; and
select the search query as the identified search query in view of determining that the first number of users is greater than a second threshold.

16. The non-transitory machine-readable medium of claim 14, wherein:
the history of search queries specifies search results of respective search queries and views of the search results by users;

the first media item included in the search result of the search query was viewed by at least one user that submitted the search query; and the one or more additional media items included in the search result of the search query were viewed by at least one user that submitted the search query.

17. The non-transitory machine-readable medium of claim 14, wherein identifying the subset, the processing device is to:

determine that the one or more additional media items include a second media item of a second media owner identified in an excluded media owner list; and exclude the second media item from the subset.

* * * * *